United States Patent
Chouzenoux et al.

(10) Patent No.: US 7,703,515 B2
(45) Date of Patent: Apr. 27, 2010

(54) METHODS AND APPARATUS FOR COMMUNICATING ACROSS CASING

(75) Inventors: Christian Chouzenoux, St. Cloud (FR); Veronique Nouaze, Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 221 days.

(21) Appl. No.: 11/719,382

(22) PCT Filed: Nov. 24, 2005

(86) PCT No.: PCT/EP2005/012693

§ 371 (c)(1),
(2), (4) Date: May 15, 2007

(87) PCT Pub. No.: WO2006/056474

PCT Pub. Date: Jun. 1, 2006

(65) Prior Publication Data

US 2009/0159276 A1    Jun. 25, 2009

(30) Foreign Application Priority Data

Nov. 26, 2004   (EP) ................................. 04292801

(51) Int. Cl.
*E21B 47/00* (2006.01)
*E21B 49/00* (2006.01)

(52) U.S. Cl. .................................. 166/254.1; 166/66.5
(58) Field of Classification Search ............ 166/250.01, 166/66, 66.5, 254.1
See application file for complete search history.

(56) References Cited

U.S. PATENT DOCUMENTS

| 5,038,107 | A | * | 8/1991 | Gianzero et al. ............ 324/339 |
| 6,070,662 | A | * | 6/2000 | Ciglenec et al. .......... 166/254.1 |
| 6,234,257 | B1 | * | 5/2001 | Ciglenec et al. ................ 175/50 |
| 6,480,000 | B1 |   | 11/2002 | Kong et al. |
| 2002/0105333 | A1 | * | 8/2002 | Amini ........................ 324/338 |

FOREIGN PATENT DOCUMENTS

| EP | 0434439 | 6/1991 |
| EP | 000434439 A2 * | 6/1991 |
| EP | 0984135 | 3/2000 |
| WO | WO0165069 | 9/2001 |

* cited by examiner

*Primary Examiner*—William P Neuder
(74) *Attorney, Agent, or Firm*—Myron K. Stout

(57) ABSTRACT

A system for passing an electromagnetic signal through a casing comprises a tool body that can be positioned inside the casing; means for magnetically saturating the casing in the vicinity of the tool; a transmitter for transmitting an electromagnetic signal from the tool antenna to the outside of the casing for reception at one or more sensors equipped with an antenna and electronic circuits located outside the casing; and a detector for detecting an electromagnetic signal at the tool from the sensor located outside the casing.

26 Claims, 2 Drawing Sheets

METHODS AND APPARATUS FOR COMMUNICATING ACROSS CASING

This invention relates to methods and apparatus for establishing a wireless communicating between a tool located inside a casing and a sensor or sensor unit located outside the casing. In particular, the invention is applicable to the use of such methods and apparatus in oil and gas wells and the like, or in surface or subsurface pipelines.

A sensor unit can comprise a sensing device with its associated electronics including circuits such as converters, amplifiers, battery and micro-controller and connected to an antenna for communication link and powering. The invention is particularly concerned with the measurement of pressure in formations surrounding the borehole but the technique applies to any type of formation parameter measurements such as resistivity, acoustic, chemicals, etc.

In a typical oil or gas well, a borehole is lined with a steel casing to provide physical support to prevent borehole collapse and to provide zonal isolation and prevent fluid communication between separate layers via the borehole. While steel casing is very effective in this use, it does provide a barrier to the passage of electromagnetic signals passing between the inside of the borehole and the outside of the casing. Such signals are often used in open (uncased) boreholes to evaluate the formation surrounding the borehole and are particularly useful in techniques for identifying the presence of hydrocarbon or water. Because of the barrier provided by the steel casing measurement techniques for looking through the casing have previously relied on non-electromagnetic techniques, such as acoustic measurements and nuclear measurements. Recently, certain electrical techniques have been proposed for use in the presence of steel casing. One technique for measuring the resistivity of a formation outside a casing involves placing spaced electrodes in contact with the inside of the casing and measuring the leakage current into the formation as a current is passed along the casing between the electrodes. Another technique is described in U.S. Pat. No. 5,038,107 in which an induction measurement is made by placing a tool in the borehole which magnetically saturates the casing while making induction measurements at about 2 kHz from within the casing.

This latter technique relies on the fact that the AC magnetic permeability of steel is reduced to a low value (substantially unity) when magnetically saturated. Thus the induction measurement signal can pass out of the borehole, into the formation and can be detected and measured back in the borehole, despite the presence of the casing.

Long term monitoring of wells has recently become desirable. In order to achieve this, it is proposed to locate sensors outside the casing in the borehole, possibly buried some distance in the formation around the borehole. U.S. Pat. Nos. 6,234,257 and 6,070,662 describe techniques for placing a sensor into the formation, in an open or in a cased hole. The sensor can then be interrogated by means of an antenna, which communicate with an interrogating tool.

In view of the difficulty in communicating through the casing, it has also been proposed to provide electrical cabling on the outside of the casing to provide communication and power between the surface and the sensor. Such techniques have been proposed in U.S. Pat. Nos. 5,467,823 and 5,642,051. However, external cabling is considered difficult to install, vulnerable to damage and expensive. If the cable is broken, it becomes impossible to communicate with the sensors. Other approaches involve the use of non-conductive casing (U.S. Pat. No. 6,515,592), or the provision of non-conductive windows in the casing to allow electromagnetic communication between the inside and outside of the casing (U.S. Pat. No. 6,426,917). These are also considered complicated and difficult to deploy.

While the problems discussed above are presented in relation to borehole casing, similar issues arise with production tubing positioned inside the cased borehole. As the tubing is steel, it is similarly difficult to communicate from the inside of the tubing to the outside of the tubing inside the casing. It has been proposed to place sensors in this space also. In this application, the terms "casing" and "tubing" are used synonymously unless indicated otherwise.

It is an object of the invention to provide a technique that allows sensors to be positioned outside the casing while still allowing communication from inside the casing without the problems of the previous techniques. The invention achieves this objective by magnetically saturating the casing near the sensor in order that electromagnetic signals can pass between the sensor in outside the casing and the inside of the casing. The wireless link is ensured via electromagnetic coupling between two antennae respectively located in the sensing unit and in the interrogating tool and via a system for magnetically saturated the casing in order to permit the propagation of electromagnetic signals through the steel casing.

A first aspect of the invention provides a method of passing an electromagnetic signal through a casing, comprising positioning a tool, for example a wireline conveyed tool, inside the casing; using the tool to magnetically saturate the casing; transmitting an electromagnetic signal from the tool to the outside of the casing; and detecting an electromagnetic signal at the tool from outside the casing; characterized in that the method further comprises receiving the signal at a sensor located outside the casing and in transmitting the electromagnetic signal detected at the tool from the sensor.

A second aspect of the invention provides a method of monitoring an underground formation surrounding a cased borehole, comprising positioning a sensor in the formation outside the casing; measuring a parameter of the formation using the sensor; positioning a tool inside the casing near the sensor; and communicating the measured parameter from the sensor to the tool using a method in accordance with the first aspect of the invention.

A third aspect of the invention provides apparatus for passing an electromagnetic signal through a casing, comprising a tool body that can be positioned inside the casing; means for magnetically saturating the casing in the vicinity of the tool; a transmitter for transmitting an electromagnetic signal from the tool to the outside of the casing for reception at a sensor located outside the casing; and a detector for detecting an electromagnetic signal at the tool from outside the casing; characterized in that the detector receives a signal transmitted from the sensor located outside the casing.

The sensor unit can be interrogated and powered during an extended period after the placement in the formation or outside the casing via an antenna that can communicate with an interrogating tool. The transmitter includes an antenna and its associated electronics for electromagnetic signals generation. The detector includes an antenna and the associated electronics for signal decoding.

A fourth aspect of the invention provides a system for passing an electromagnetic signal through a casing, comprising an apparatus according to the third aspect of the invention and one or more sensors located outside the casing for receiving the signal transmitted from the tool and for transmitting a signal to the tool.

The means for magnetically saturating the casing preferably comprises a core having a high magnetic, permeability that can be positioned adjacent to the casing and can be energized by means of an electric coil. The core is preferably positioned in the casing so as to focus flux towards the casing.

An interrogating antenna can be positioned around the core for transmitting and/or receiving the electromagnetic signals. The signals typically have frequencies lying in the range 1-10 kHz.

The electromagnetic signal transmitted from the tool antenna can also be used to provide power to the sensor electronics.

The sensors can be positioned in a formation surrounding a borehole in which the casing is located or in a further casing lining a borehole in which the casing (tubing) is located. The sensors can comprise single sensors, sensor units, sensor systems or micro-systems depending on the application.

The technique proposed in U.S. Pat. No. 6,234,257 can be implemented to force the sensor unit into the open hole formation. The casing is set and cemented after sensor placement. The advantage of the casing saturation method detailed here is that the communication link with the sensor can be ensured through the casing without any modification of the casing joint. This is a great advantage compared to other technique requiring drilling an aperture into the casing, or having non-conductive slots into the casing, for example.

Alternatively, the technique proposed in U.S. Pat. No. 6,070,662 can be implemented to force the sensor unit through a casing into the surrounding formation. In this case, the casing is set and cemented before the sensor placement. The advantage of the casing saturation method detailed here is that the communication link with the sensor can be ensured through the casing without any modification of the casing joint. This is a great advantage compared to other technique requiring drilling an aperture into the casing, or having non-conductive slots into the casing, for example.

The invention will now be described in relation to that accompanying drawings, in which.

This invention provides a technique for establishing a wireless communication link between sensors placed outside a well casing (or tubing) and an interrogating tool that is in the interior of the casing (or tubing). An embodiment of the proposed system is based on electromagnetic wave propagation superimposed on a magnetic DC saturation of the casing in order to reduce the EM wave attenuation. By magnetically saturating the casing metal, its AC magnetic permeability is reduced to a low value, typically close to unity, and it becomes possible to propagate high frequency electromagnetic waves through it. The technique can be used to communication and power activation of a device permanently in contact with the formation having embedded electronics and sensors and that is placed outside the well casing (or tubing).

The technique applies for various types of sensors. The different sensors can include pressure, temperature, resistivity, chemical content, casing stress and strain measurements. The implementation of a wireless communication system allows deploying underground sensors with no cabling constraints and no modification of the casing Applications of the invention cover various domains such as oil and gas exploration and production, well testing and evaluation, water storage, gas storage and waste underground disposal The system provides a technique for communicating with permanent sensors systems located behind well casing without the presence of cables and any modification of the casing. The wireless link is ensured via electromagnetic coupling between two antennae respectively located in the sensing unit and in the interrogating tool. The sensing unit is placed in the formation whereas the interrogating tool is located inside the well casing. The interrogating tool has means for magnetically saturating the casing in its vicinity so that the transmission of superimposed electromagnetic waves becomes feasible.

Figure 1:
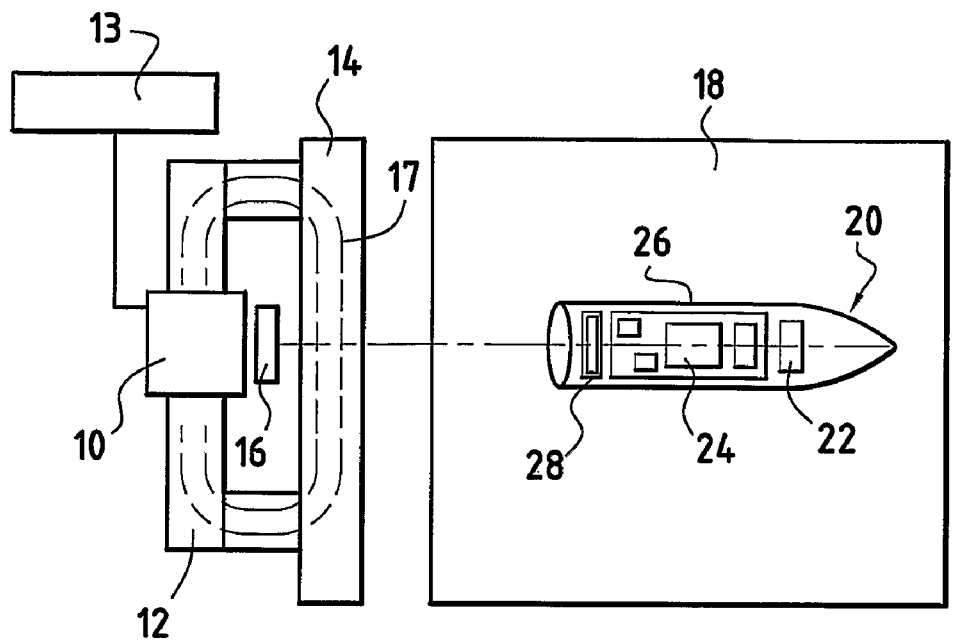
FIG. 1 shows a schematic view of a system according to an embodiment of the invention.

The principle of the system is illustrated on FIG. 1. Although many techniques can be applied to achieve casing saturation, the technique described in FIG. 1 is the preferred one. A coil 10 is mounted around a high permeability central core 12. A high level current is applied to the coil 10 from a current generator 13 and results in a high amplitude magnetic flux in the core 12 and in the casing 14. The current is preferably a DC current. The flux circulates into the core 12 and the casing 14. The gap between the core 12 and the casing 14 is preferably minimised by used of specific core geometry in order to focus the flux towards the casing 14. When the casing 14 is saturated, its magnetic permeability is reduced to a low value, close to unity.

Figure 2:
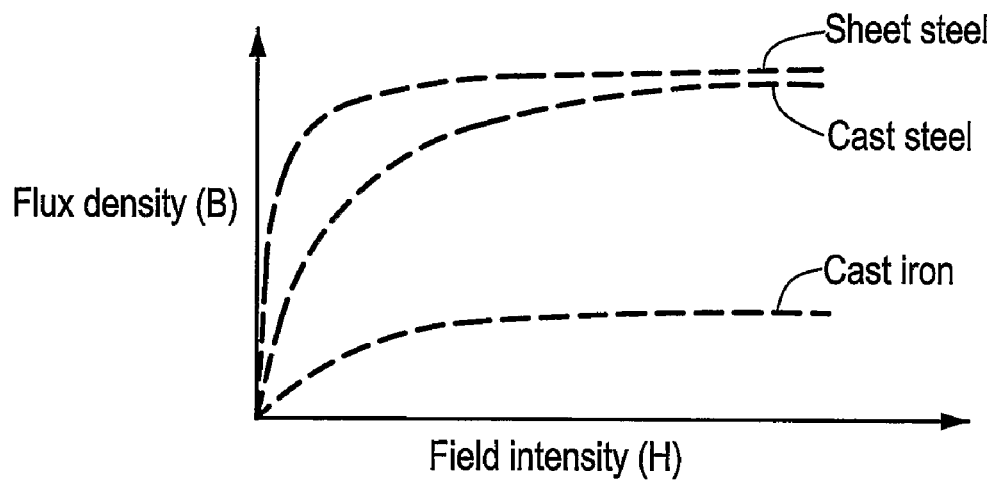
FIG. 2 shows a plot of a B-H curve for steel.

The magnetic permeability is given by the ratio of the flux density over the field intensity. The non-linearity of steel magnetic permeability is shown in FIG. 2 for better understanding. The permeability of steel changes with the amount of magnetic flux that is forced through it. The attenuation of electromagnetic waves through metal is mainly governed by the skin depth formula that basically corresponds to the penetration distance. The skin depth $\delta$ is given by the formula:

$$\delta = \sqrt{\frac{2}{\omega \mu \sigma}}$$

$\omega$ notes the waves angular frequency, $\mu$ is the magnetic permeability and $\sigma$ is the casing conductivity. Due to its magnetic permeability and its high conductivity, the casing classically acts as a barrier for EM waves.

Table 1 below shows the skin depth values for various frequency range and steel permeability.

TABLE 1 skin depth for varying steel permeability and signal frequency values

| Steel Conductivity (S/m) | 0.10 kHz | 1.0 kHz | 10. kHz | 20. kHz | 100. kHz | Steel Magnetic Permeability |
|---|---|---|---|---|---|---|
| 2.0E06 | 3.6 mm | 1.1 mm | 0.4 mm | 0.3 mm | 0.1 mm | 100.0 |
| 2.0E06 | 11.3 mm | 3.6 mm | 1.1 mm | 0.8 mm | 0.4 mm | 10.0 |
| 2.0E06 | 35.6 mm | 11.3 mm | 3.6 mm | 2.5 mm | 1.1 mm | 1.0 |

In a magnetically saturated state, the AC permeability is reduced toward the unity and the skin depth is therefore significantly increased. The penetration depth of EM waves in steel is consequently increased.

By superimposing high frequency electromagnetic waves on top of the massive DC flux, the transmission of EM waves becomes achievable. The communication link can be established between two antennae separated by the metal casing. The link can be made with higher frequencies and less attenuation than without saturating the casing.

In the case of the present invention, an interrogating antenna 16, typically in the form of a further coil on the core 12, applies the high frequency signal. With casing conductivity in the order of 2 e+06 S/m, the working frequency can be in the 1 to 10 kHz range in order to penetrate casing thickness, classically in the order of half an inch. The optimum frequency for transmission can be set according to the casing magnetic and electrical properties. These properties may varies a lot from wells to wells so that a programmable frequency is highly desirable. A frequency above 10 kHz may be employed with high sensitivity antennae and sophisticated electronics. The signal produced by the antenna 16 passes through the casing 14, the layer of cement 17 around the casing 14 and the formation 18 around the cased borehole to an embedded sensing unit or plug 20.

The sensing unit 20 is a miniaturized and integrated device that is permanently deployed in underground formation 22 surrounding the borehole with embedded sensors and dedicated electronics. The sensor plug 20 comprises sensing elements 22, an electronics platform 24 inside a protective housing 26, and a communication antenna 28.

The plug 20 is autonomous and has integrated functionalities in order to perform dedicated tasks such as data acquisition, internal data saving and communication with the interrogating tool according to the invention.

Figure 3:
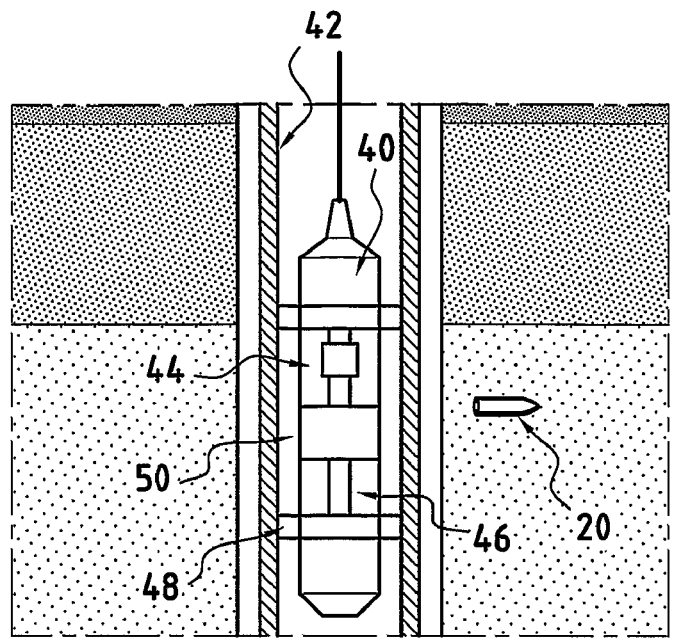
FIG. 3 shows a more detailed view of a system corresponding to that of FIG. 1.

An embodiment of a system for wireless interrogation of a sensor placed behind casing is shown in FIG. 3.

The tool 40 is equipped with a system for magnetically saturating the casing. The preferred system is based on generating a magnetic flux that is sufficiently massive to saturate the casing 42 in its vicinity. The magnetic saturation can be achieved via one or several coils 44 mounted around a magnetic core 46 inside the tool. High power electronics are required to drive the coils. The driving electronics is advantageously embarked in the downhole tool. The required electrical power is transmitted from the surface to the downhole tool electronics via a classical wireline cable. The tool is preferably equipped with pads 48 to facilitate the flux transmission inside the casing. The tool is equipped with an antenna 50, possibly also mounted around the same high permeability core 46, that ensure the EM link with the formation sensor antenna.

When the tool is proximate the plug 20, electro-magnetic coupling between the two antennae 50, 28 through the casing 14, is effective and ensures the wireless communication. The data acquired by the sensing unit 20 are transferred to the wireline-tool 40 and sent up-hole for further analysis.

The same technique can be used for communication link and power transfer. Wireless power transfer removes the need for an embedded battery in the sensing unit. Alternatively, an embedded battery may be provided in the sensing unit in order to conduct time-lapse measurements between intervals of time when the unit is being interrogated.

The power transfer can be used to re-load the battery in the sensing unit.

The sensing device 20 may be deployed in open hole formation, prior to casing placement with a technique similar to the one described in U.S. Pat. No. 6,234,257. In another embodiment (shown in FIG. 4) the sensing device 30 may be deployed in cased hole 60, prior to placement of production tubing 62 with a technique similar to the one described in U.S. Pat. No. 6,070,662.

Figure 4:
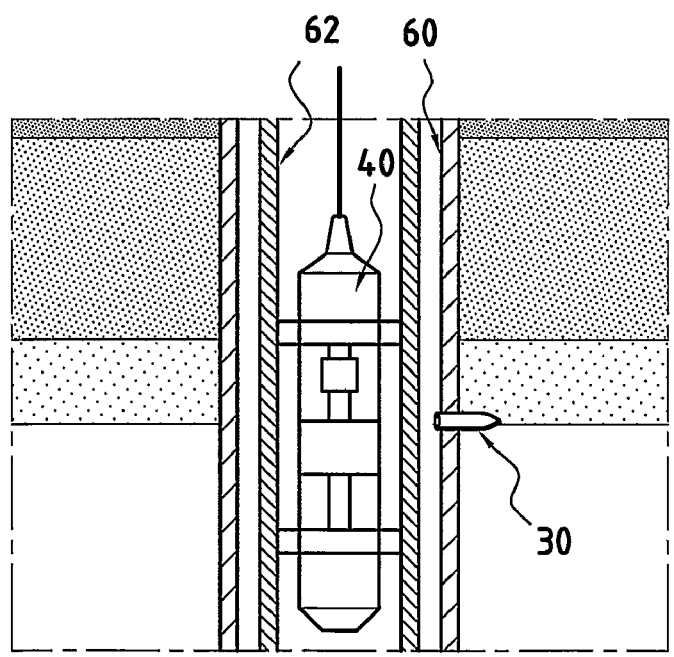
FIG. 4 shows a further embodiment of the invention for use in production tubing.

In this case, the proposed technique allows establishing a wireless communication with a formation sensor 30 placed outside the well production tubing 62, as shown in FIG. 4. In this configuration, the wireless link is established by saturating the tubing 62 in the close vicinity of the sensor 30. Reading of the sensor through tubing therefore becomes feasible.

The technique according to the invention can be extended for communication through any type of metal pipes, preferably downhole but also surface pipes.

The technique can be implemented in a wireline-logging mode for periodic reading of the sensors as described above or in a permanent fashion, the interrogating tool being permanently set in the well and linked to a surface recording unit.

Other variations within the scope of the invention will be apparent.

What is claimed is:

1. A method of communicating across casing, comprising positioning a tool inside the casing;
   using the tool to generate a magnetic flux capable of magnetically saturating the casing in the vicinity of the tool;
   transmitting an electromagnetic signal from the tool to the outside of the casing;
   receiving the transmitted electromagnetic signal at a formation sensor located outside the casing; and
   detecting an electromagnetic signal at the tool from outside the casing;
   wherein the method further comprises superimposing the transmitted electromagnetic signal on the magnetic flux.

2. The method as claimed in claim 1, wherein the formation sensor is a sensor unit permanently positioned in the formation.

3. The method as claimed in claim 1, wherein the step of magnetically saturating the casing comprises positioning a magnetic core having a high magnetic permeability adjacent the casing and energizing the magnetic core by means of an electric coil.

4. The method as claimed in claim 3, comprising positioning the magnetic core with respect to the casing so as to focus the flux towards the casing.

5. The method as claimed in claim 3, wherein the steps of transmitting the electromagnetic signal and detecting an electromagnetic signal are achieved using an interrogating electromagnetic antenna.

6. The method as claimed in claim 5, wherein the antenna is a coil mounted around the magnetic core.

7. The method as claimed in claim 1, wherein frequencies of the electromagnetic signals are selected according to casing magnetic and electrical properties.

8. The method as claimed in claim 1, wherein frequencies of the electromagnetic signals lie in the range 1-10 kHz.

9. The method as claimed in claim 1, further comprising providing power to the formation sensor by means of the transmitted electromagnetic signal.

10. The method as claimed in claim 9 wherein the power is used to power electronics in the formation sensor and/or reload an embedded battery.

11. A method of monitoring an underground formation surrounding a cased borehole, comprising the steps of:
    positioning a formation sensor in the formation outside the casing;
    measuring a parameter of the formation using the formation sensor;

positioning a tool inside the casing near the formation sensor; and communicating the measured parameter from the formation sensor to the tool using the method as claimed in claim 1.

12. The method as claimed in claim 11, wherein the formation sensor comprises a sensor unit permanently positioned in the formation.

13. Apparatus for communicating across casing, comprising:

a tool body that can be positioned inside the casing;

means for generating a magnetic flux capable of magnetically saturating the casing in the vicinity of the tool;

a transmitter for transmitting an electromagnetic signal via the magnetic flux from the tool to the outside of the casing for reception at a formation sensor located outside the casing; and a detector for detecting an electromagnetic signal at the tool from outside the casing;

wherein the detector receives an electromagnetic signal transmitted from the formation sensor located outside the casing.

14. The apparatus as claimed in claim 13, wherein the formation sensor comprises a sensor unit permanently positioned in the formation.

15. The apparatus as claimed in claim 13, wherein the means for magnetically saturating the casing comprises a magnetic core a core having a high magnetic permeability casing and an electric coil for energizing the core.

16. The apparatus as claimed in claim 15, wherein when the tool body is positioned in the casing, the magnetic core is positioned with respect to the casing so as to focus the flux towards the casing.

17. The apparatus as claimed in claim 15, further comprising an interrogating coil mounted around the magnetic core.

18. The apparatus as claimed in claim 17, wherein the interrogating coil acts as transmitter and/or receiver.

19. The apparatus as claimed in claim 13, wherein frequencies of the electromagnetic signals are selected according to casing magnetic and electrical properties.

20. The apparatus as claimed in claim 13, wherein frequencies of the electromagnetic signals lie in the range 1-10 kHz.

21. The apparatus as claimed in claim 13, wherein the tool body is positionable in the casing by means of a wireline cable.

22. A system for communicating across casing, comprising an apparatus as claimed in claim 13 and one or more formation sensors located outside the casing for receiving the electromagnetic signal transmitted from the tool and for transmitting an electromagnetic, signal to the tool.

23. The system as claimed in claim 22, wherein the electromagnetic signal transmitted from the tool to the formation sensor provides power to the sensor.

24. The system as claimed in claim 22, wherein the formation sensor comprises an antenna.

25. The system as claimed in claim 22, wherein the formation sensor is positioned in a formation surrounding a borehole within which the casing is located.

26. The system as claimed in claim 22, wherein the formation sensor is positioned in a further casing lining a borehole in which the casing is located.

\* \* \* \* \*